July 8, 1930.  W. P. LAMAR  1,770,160
TYPEWRITER
Original Filed July 13, 1927   10 Sheets-Sheet 1

Inventor:
W. P. Lamar,
By Watson, Coit, Morse & Grindle
Attys.

July 8, 1930. W. P. LAMAR 1,770,160
TYPEWRITER
Original Filed July 13, 1927 10 Sheets-Sheet 2

July 8, 1930.  W. P. LAMAR  1,770,160
TYPEWRITER
Original Filed July 13, 1927  10 Sheets-Sheet 4
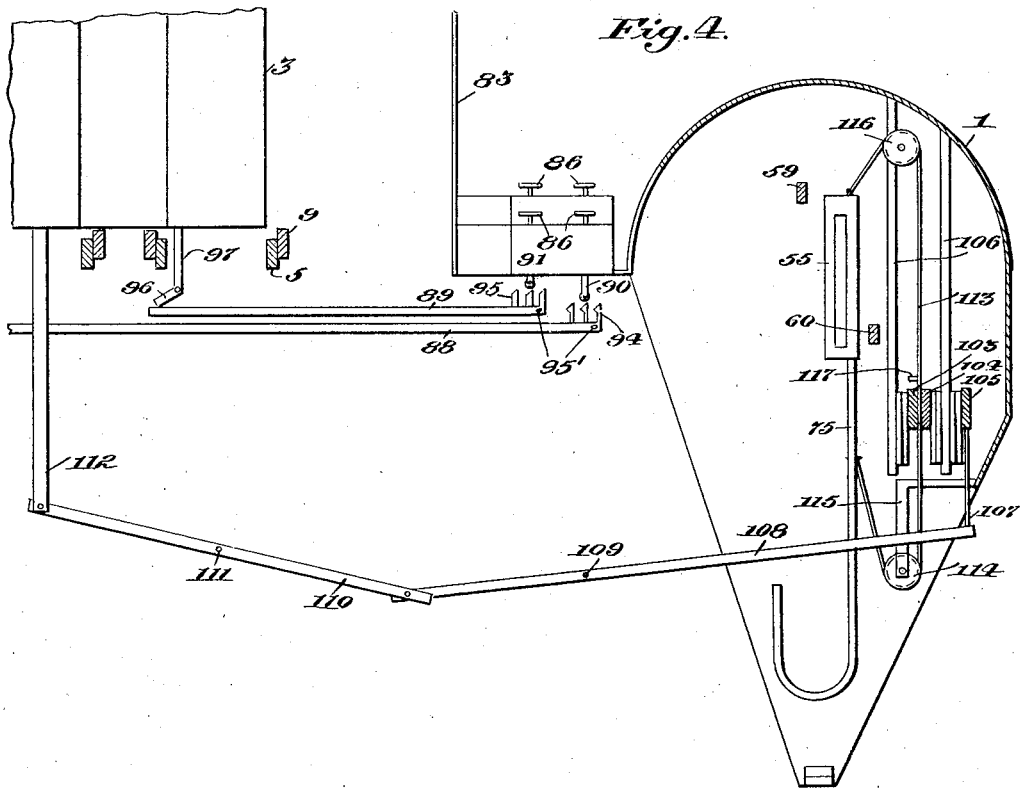
Fig. 4.
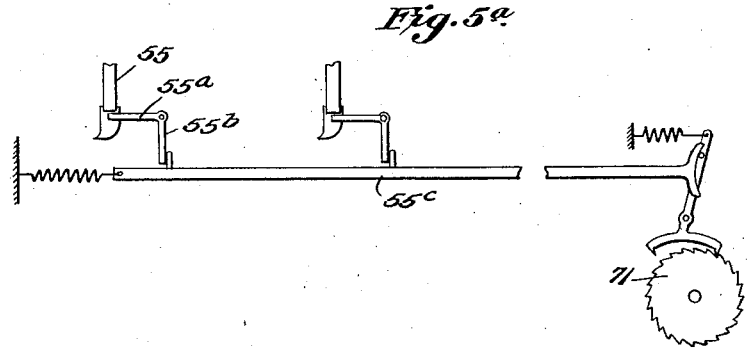
Fig. 5ª.
Inventor:
W. P. Lamar,
By Watson, Coit, Morse & Grindle,
Att'ys.

July 8, 1930.  W. P. LAMAR  1,770,160
TYPEWRITER
Original Filed July 13, 1927   10 Sheets-Sheet 5
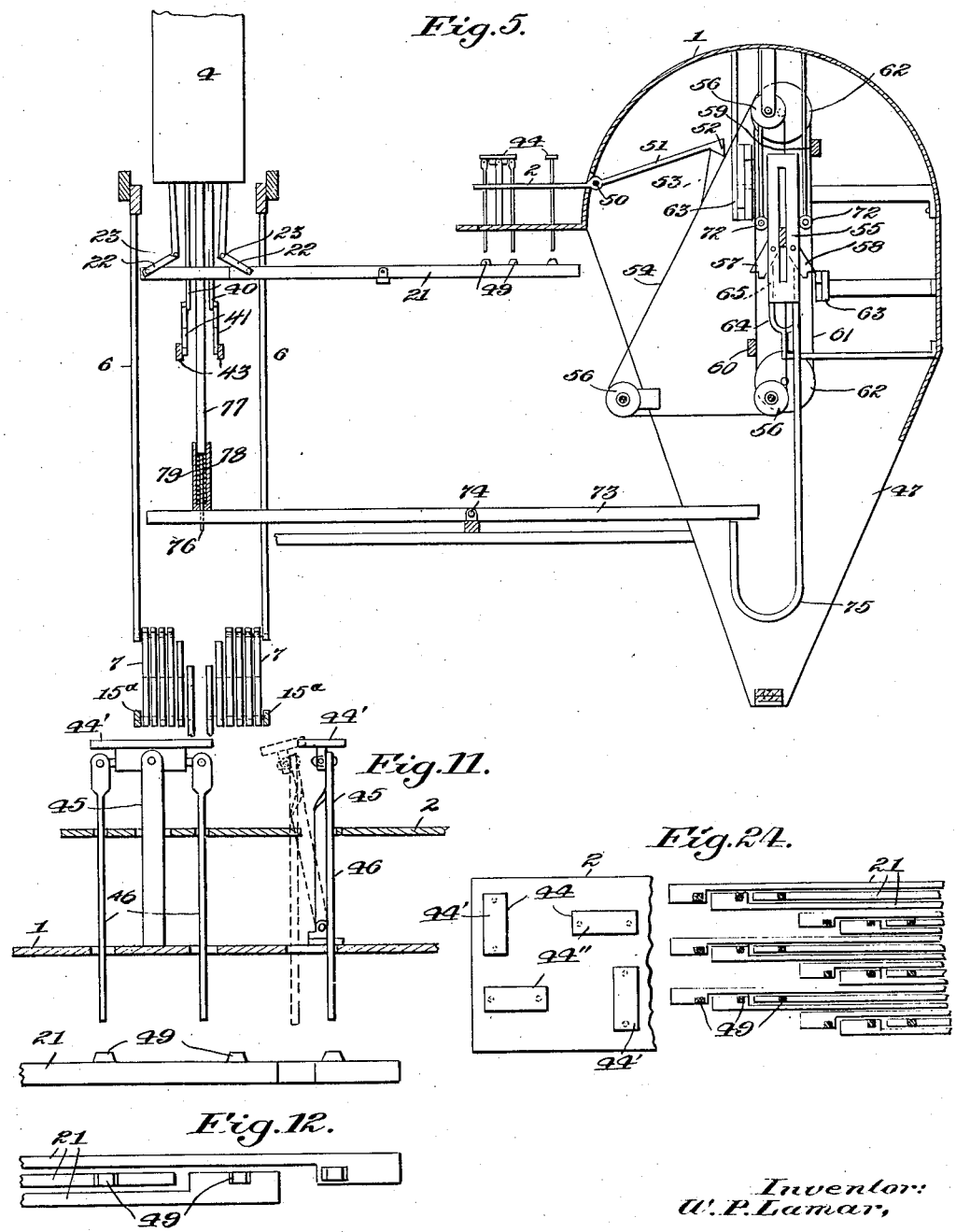

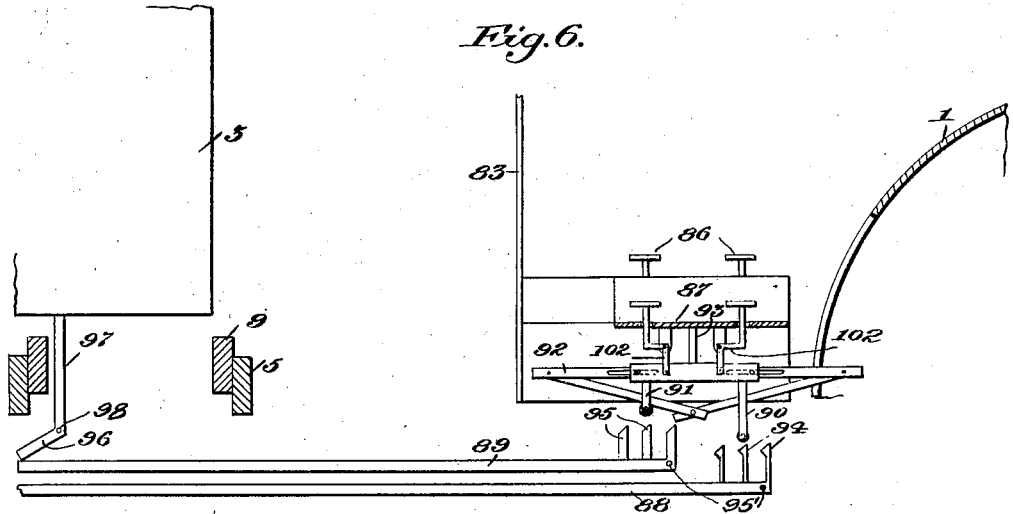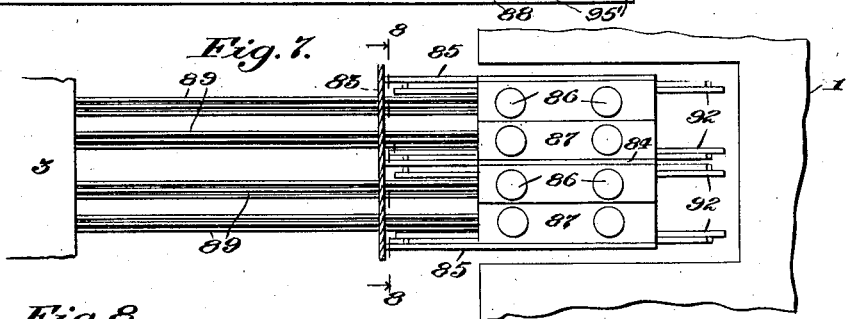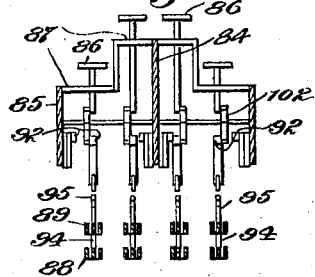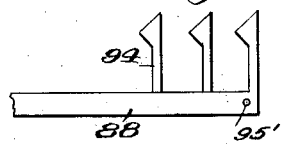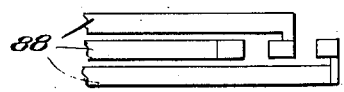

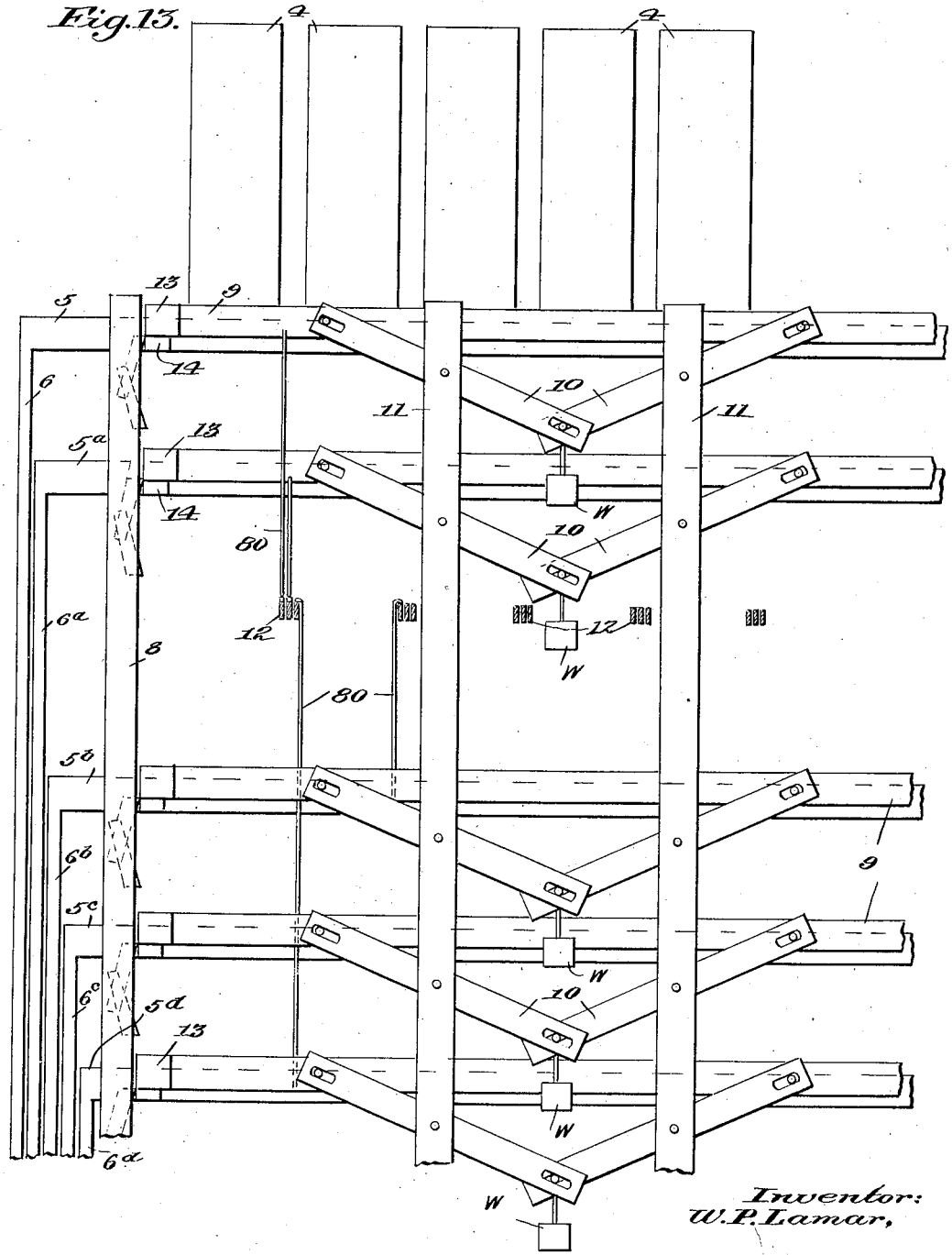

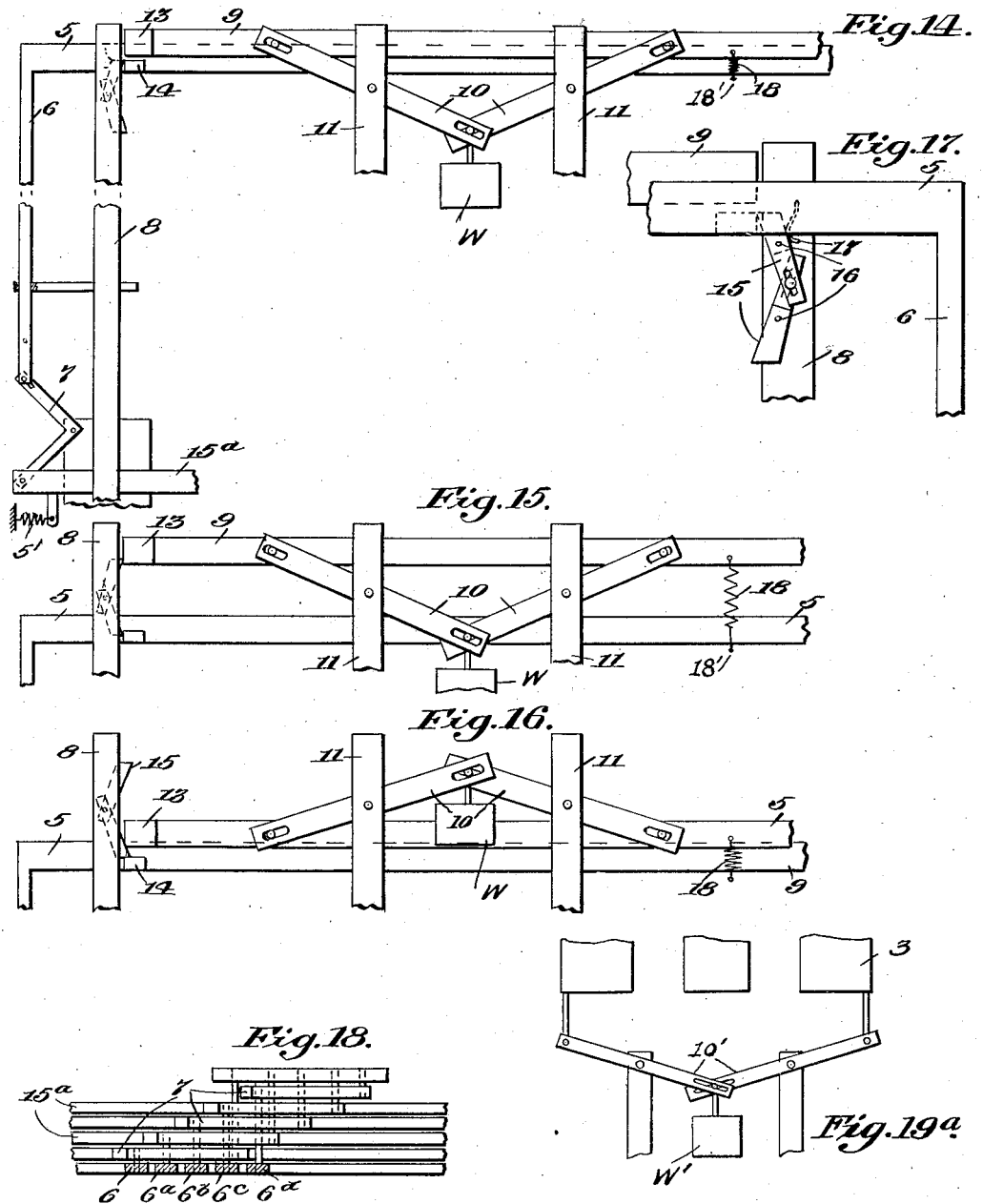

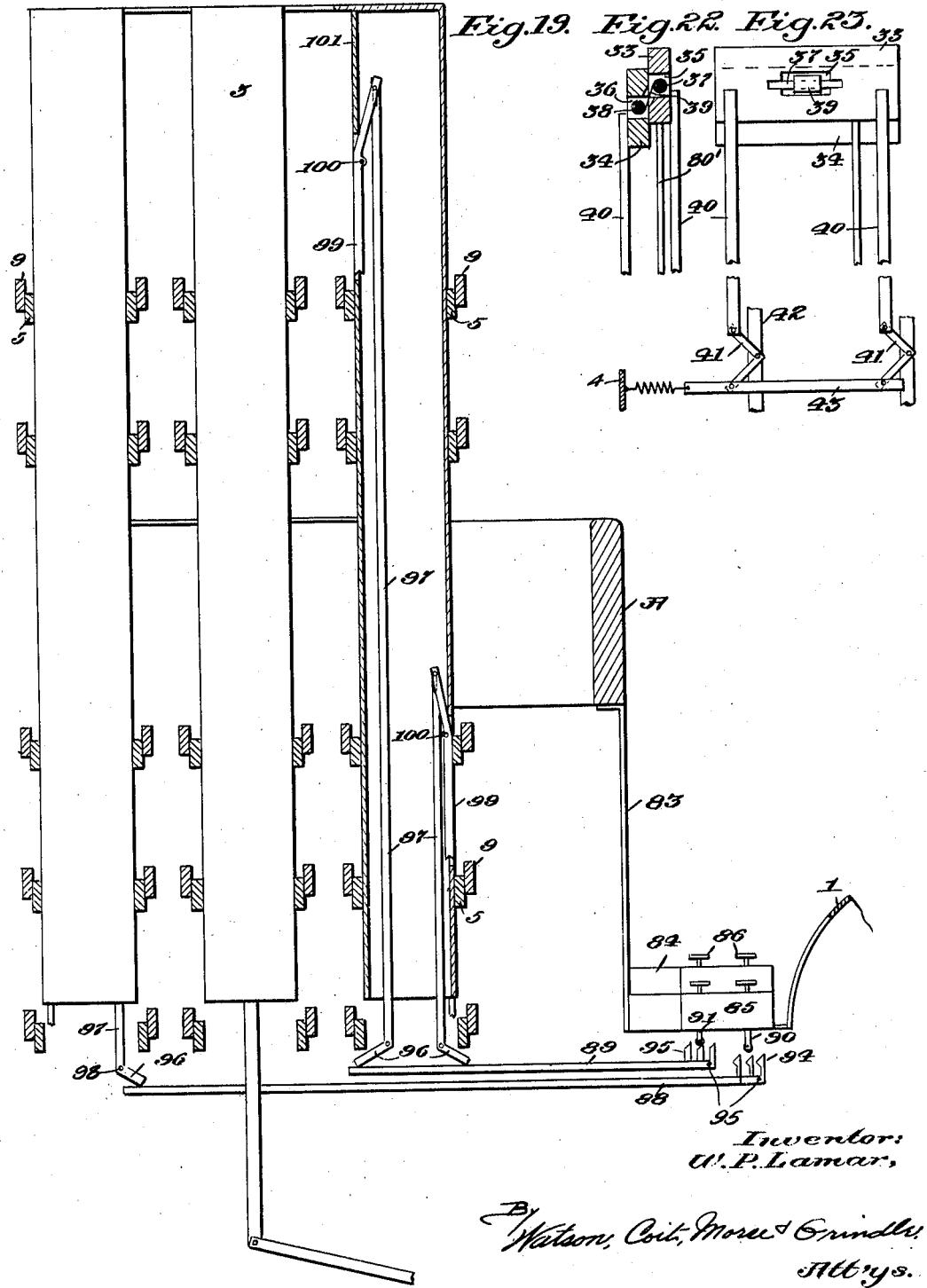

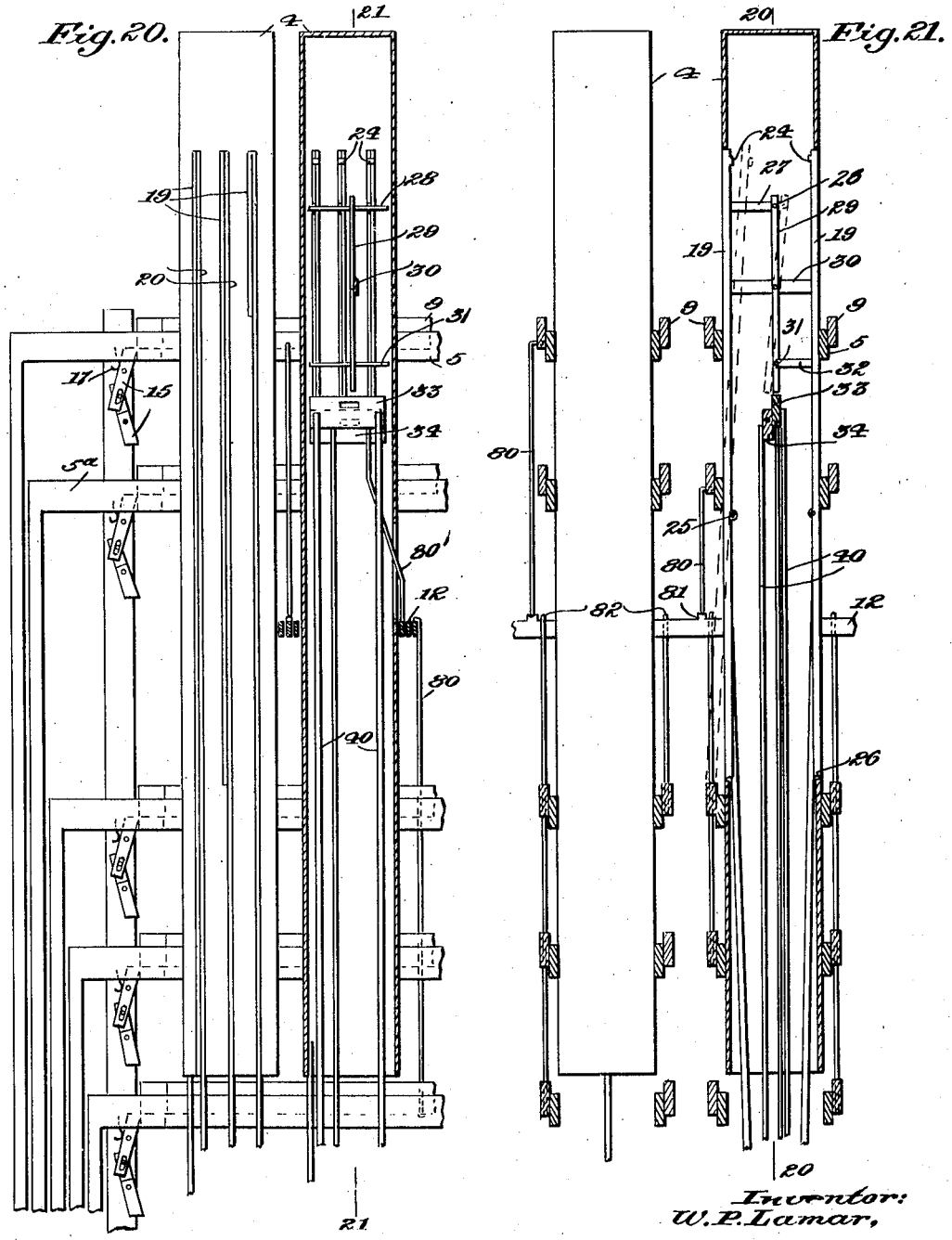

Patented July 8, 1930

1,770,160

UNITED STATES PATENT OFFICE

WILLIAM PENDLETON LAMAR, OF ATLANTA, GEORGIA

TYPEWRITER

Application filed July 13, 1927, Serial No. 205,485. Renewed November 19, 1929.

My present invention relates to typewriting machines such as are commonly used to print selected characters on paper, and has for one of its objects increasing the speed of typing by permitting the operator to print combinations of two letters at one downward stroke instead of a single letter as is the present practice.

Another object of my invention is to enable the operator to print a desired letter or character, either preceded by or followed by a second desired letter or character.

Another object of my invention is to enable the operator, in addition to printing any desired combination of two letters or characters, to add a third desired letter or character.

Another object of my invention is to permit such printing to be accomplished by power mechanism, so that the operator need make a very light downward movement on the appropriate key or keys to effect the actual printing.

Another object of my invention is to enable the operator to print short two or three letter words with a single downward movement.

With these and other objects in view, my invention consists in certain novel features of construction as hereinafter shown and described and then specifically pointed out in the appended claims.

In the drawings illustrative of the preferred embodiment of my invention, Figure 1 is a plan view of the forward portion of a typewriter containing my improved keyboard.

Figure 4 is a vertical section on the line 4—4 of Figure 3.

Figure 5 is a vertical section on the line 5—5 of Figure 3.

Figure 5ª is a detail view of certain mechanism of Figure 5 used for releasing the operating shaft.

Figure 3:
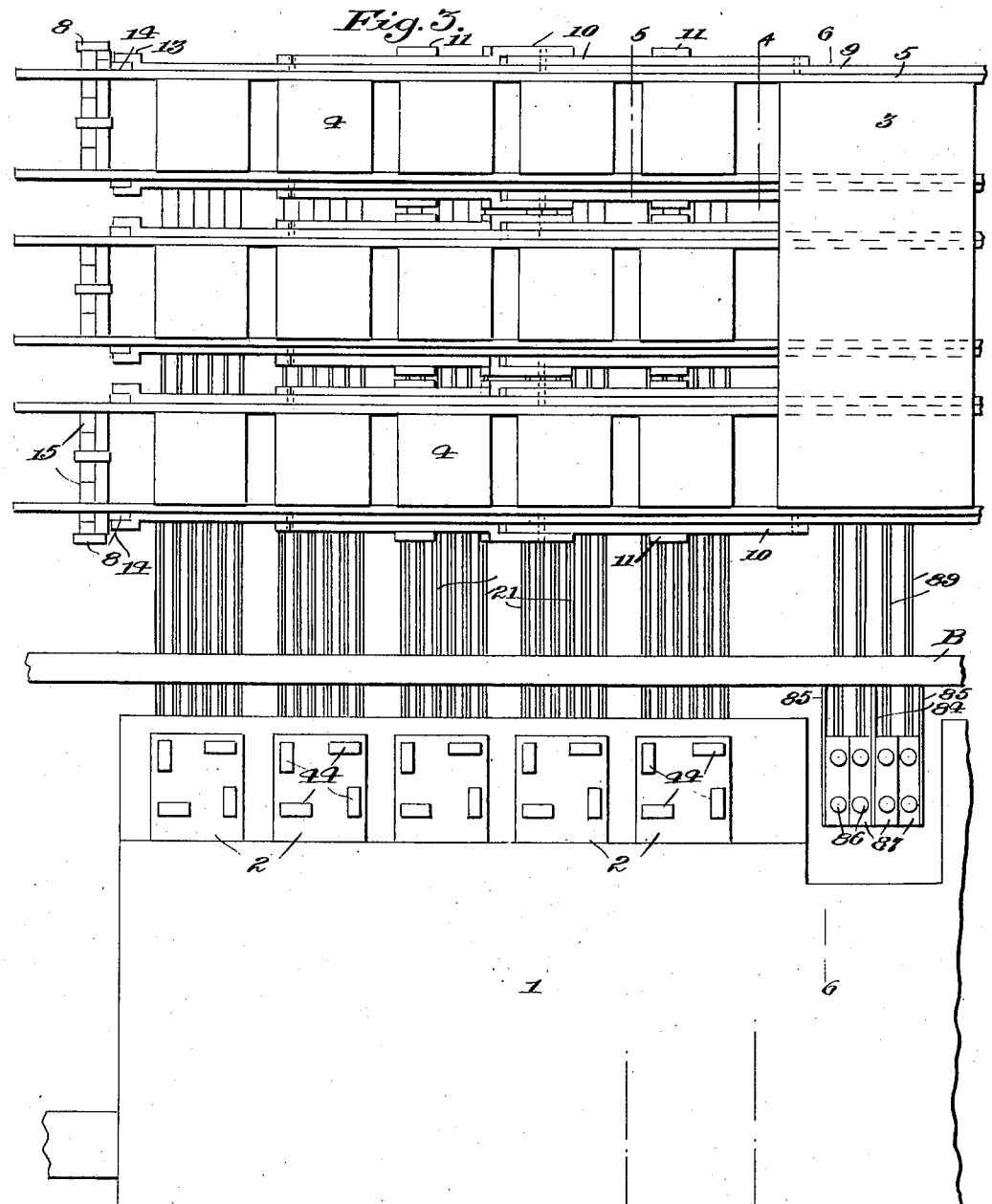
Figure 3 is an enlarged plan of the left portion of my improved keyboard.

Figure 6 is a partial vertical section on the line 6—6 of Figure 3, showing the large central controlling key.

Figure 7 is a plan view of Figure 6, showing the positions of the operating levers.

Figure 8 is a section on the line 8—8 of Figure 7, looking in the direction of the arrows.

Figures 9, 10 are enlarged detailed elevation and plan views of the lower levers shown in Figure 6.

Figure 11 is an enlarged detail of the finger keys shown in Figure 5.

Fig. 12 is a plan view of the levers operated by the finger keys shown in Figure 11.

Fig. 13 is an elevation, looking from the front of the left half of my improved letter selecting mechanism.

Figures 14, 15, and 16 are detail views illustrating the operation of the selecting mechanism shown in Figure 13.

Figure 17 is an enlarged detail looking from the rear of the latch mechanism.

Figure 18 is an enlarged fragmentary section showing in plan the shifting angles and the connected bars.

Figure 1:
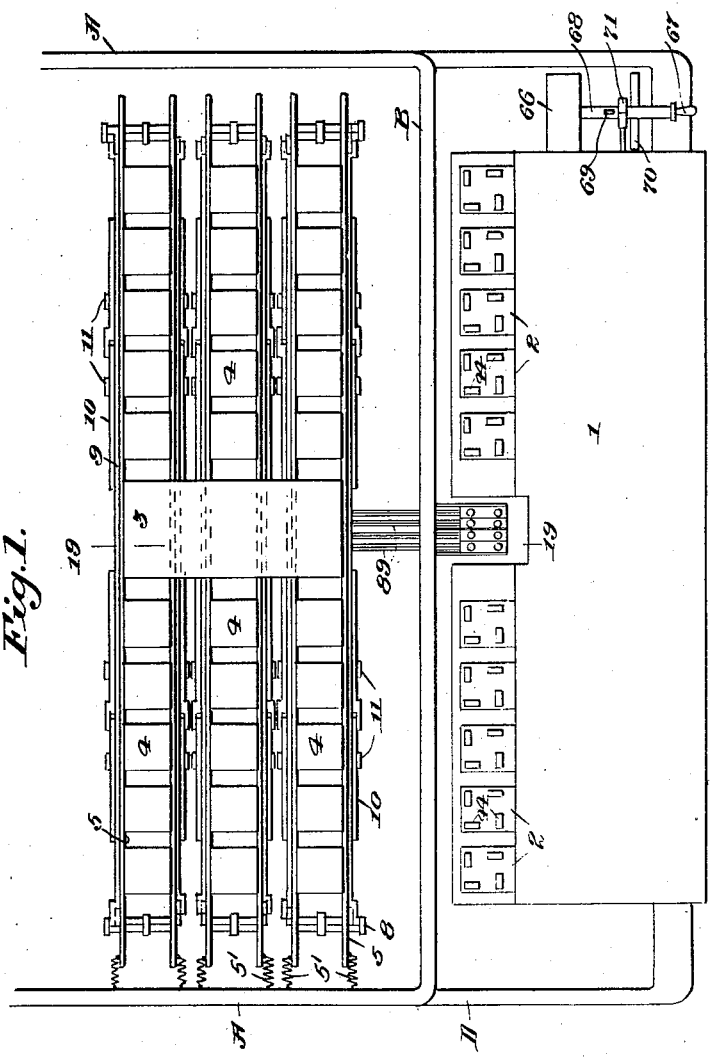

Figure 19 is an enlarged fragmentary vertical section on the line 19—19 of Figure 1, through the keyboard, showing a portion of the large central key in section.

Figure 19ª is a detail of the link mechanism and recovery weight for the main central key.

Figure 20 is an enlarged fragmentary view showing one of the finger keys in section taken on line 20—20 of Figure 21.

Figure 21 is a fragmentary section on the line 21—21 of Figure 20, showing one of the finger keys in section.

Figures 22 and 23 are enlarged details in elevation and section of the short primary and secondary bars.

Figure 24 is an enlarged detail plan of the bars beneath a finger key, the finger key being displaced to more clearly show the bars.

Figure 2:
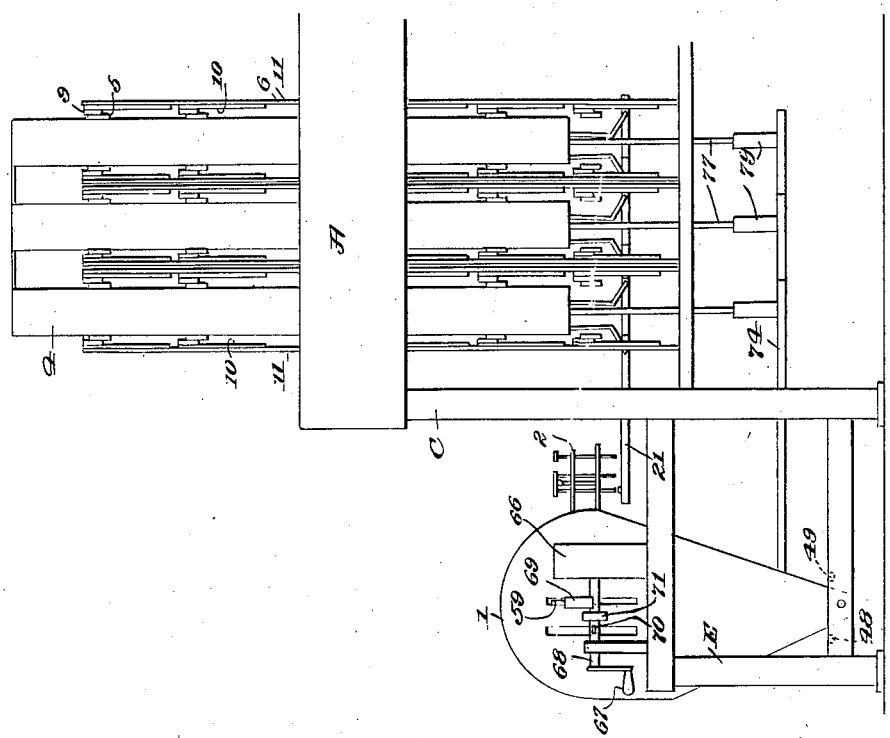
Figure 2 is a side elevation of the same, looking from the right of Figure 1.

Considering the figures in detail, and Figures 1 and 2 specifically, A represents the frame of an ordinary typewriter, and B the front cross bar of the frame A. The front posts or supports are designated as C, and are about six inches in length, replacing the customary shorter posts in order to provide the necessary space for my improved type operating mechanism. Projecting forwardly from posts C, and about halfway between the frame A and the usual typewriter table, is an extension D supported at its forward end by posts E, and serving to carry or support a housing 1 containing the operating mechanism hereinafter described, and controlled by finger keys 2.

The usual typewriter keys having been removed, mechanism for selecting and printing characters is inserted over the old keyboard, and is controlled by finger key 2 through the medium of other mechanism to be hereinafter described. After the usual typewriter keys have been removed, the type depressor bars are bent to right and left from the center to leave a space approximately two inches in width and extending from the front to the back of the keyboard for the insertion of a third character control key 3, as hereinafter described.

On each side of the control key 3 are three rows of five casings 4 making a total of 30 casings, which take the place of the old typewriter keys; running from right to left of the machine, front and back of each of the three rows of casings 4, and guided by these casings, are horizontally disposed inverted U shaped primary bars 5, (see Figure 13), having at either end downwardly extending arms 6 which are pin and slot connected to angles 7, as best shown in Figure 14.

In the same plane with bars 5, but arranged underneath, one below the other, are four additional bars 5ª, 5ᵇ, 5ᶜ, and 5ᵈ, of the same general form as bars 5, and for the same purpose, as hereinafter described. These bars are successively shorter, the depending arms 6, 6ª, 6ᵇ, 6ᶜ, and 6ᵈ nesting within one another as shown in Figure 13. On the opposite side of the bars from the keys 4 are vertical guides 8 (see Figure 1) rising from the base of the machine and cooperating with keys 4 to maintain the bars in a vertical plane.

Parallel with and adjacent to the bars 5 and positioned on the side of the bars away from the keys 4 are secondary bars 9, the upper surface or edge of bars 9 being slightly raised, about one eighth of an inch, above the upper surface or edge of bars 5. Mounted on each secondary bar 9 on both sides of central control key 3 are links 10 for always maintaining bar 9 in a horizontal position irrespective of the vertical displacement of bars 9 as hereinafter described. These links 10 are pin and slot connected with each other, at one end, and with secondary bar 9, at their other ends, and are pivoted at approximately their centers to stationary uprights 11 suitably secured or fastened to the frame A. A weight W at the junction of links 10 causes the links to recover bars 9 to their original position. The central key 3 has a similar weight W' and links 10' for maintaining its horizontality. (See Figure 19ª.)

As best shown in Figure 13, the bars 5 and 9 are not equally spaced vertically, the space between the second and third bars from the top being approximately double that between the others. In this wide space are located the usual type depresser bars 12, the vertical position of these depressor bars being the same as in the usual typewriter. These bars are grouped in sets of three between the walls of keys 4, having been bent laterally as previously described.

At each end of secondary bars 9 are offsets 13, fitting over lugs 14 integral with or secured to primary bars 5. Attached to uprights 8 adjacent the lugs 14 are latch members, (see Figure 17), comprising two relatively thick arms 15 pin and slot connected to each other and pivoted to upright 8 by means of pins 16, said arms being as thick as bars 5 and 9 combined. A spring 17 attached to upright 8 presses against the upper arm 15 of each latch, and maintains the arm 15 in contact with lug 14 and beneath the off-set end of secondary bar 9, thus enabling primary bar 5 to be depressed a short distance while secondary bar 9 remains stationary, but depressing bar 5 when secondary bar 9 moves downward. If the bar 9 is pressed, the lug 13 thereon engages the lug 14 on the bar 5 and both bars are moved downwardly together. The latch 15 bearing against the lug 14 is held from engaging under the lug 13 and permits this movement. If the bar 5 is pressed, the lug 14 moves out from the latch 15 and allows it to pass under the lug 13 and retain the bar 9 in its upper position until the lug 14 engages the lower member of the latch 15 and through the pin connection of the two members releases the lug 13 and allows the bar 9 to follow it a delayed interval after the downward movement of the bar 5. As shown in Figures 15 and 16, a centrally positioned spring 18 yieldingly connects bars 5 and 9, the connection of spring 18 to bar 5 being designed to permit the slight downward movement of this bar, (a slit in bar 5 or a depending link 18' being used,) to allow the bar 5 to move slightly in a downward direction without moving the bar 9, thus allowing the latch 15 to move in beneath the lug 13.

Bars 5 and 9 are moved downwardly by rods 19, six in number, located three in the front and three in the back of each key 4 (note Figure 21). These rods 19 are actuated by rods 20, the rods 20 being of substantially equal length, but rods 19 being of varying lengths, as best shown in Figure 20. Rods 20 are pivotally connected to levers 21 by means of integral offset feet 22, said feet 22 being pivoted at 23 to any stationary member such as a rod running across the machine and secured to the frame A. (See Figure 5.)

Integral with the upper end of rod 19, and on the inner side thereof, is a stud 24, extending into the path of movement of rod 20 and contacted by rod 20, so that when rod 20 swings on pivot 23 and carries the upper end of rod with it, the rod 19 is caused to swing inwardly on its pivot 25 as shown in dotted lines in Figure 21. This causes the lower end of rod 19 to swing outwardly from the wall of the key 4 so as to be positioned over either bar 5 or 9, as may be determined by the operation of the selector key as hereinafter described. The bottom or foot of rod 19 is notched as at 26, Figure 21, so as to center on the inner edge and engage both top and side of the bar to be depressed.

Adjacent the upper end of rod 19 and extending inwardly within the key 4 is a short arm 27, integral with rod 19 or secured thereto. This arm 27 abuts against a pin or bar 28 mounted through the upper end of a normally vertical rod 29 centrally pivoted to a cross bar 30 secured to the walls of key 4. Through the lower end of bar or rod 29 is another pin or short bar 31, which normally abuts against a stationary stop arm 32 secured to the wall of key 4 on the side opposite to the position of arm 27, thus normally maintaining rod 29 vertical, but permitting swinging of rod 29 on inward movement of the upper end of rod 19, as shown in dotted lines in Figure 21.

Positioned in key 4 but independent thereof and immediately below the lower end of rod 29 is a short secondary bar 33, and adjacent is a short primary bar 34 positioned slightly lower than bar 33, as best shown in Figures 22 and 23. A catch similar to the catch 15 is used for these bars, but is not illustrated to make the drawings clearer. Centrally mounted and longitudinally positioned in slots 35, 36 provided in these short bars, are rollers 37, 38 parallel to each other and interconnected by means of a spiral spring 39, adapted to return either bar to its original position when displaced downwardly by rod 29 as hereinafter described. At either end of the small bars 33, 34 and rigidly attached thereto, are downwardly extending rods 40, each pivotally connected to a separate pair of angles 41 but one of which is shown in Figure 23. The apices of these angles 41 are pivoted to the vertical supports 42 and the lower ends of each pair are pin connected to a separate horizontal recovery bar 43, spring connected to the key wall 4.

Referring back to Figure 5, bar 21 is approximately centrally pivoted and extends so as to position its forward end under a finger key 2. Each finger key 2, (note Figure 3), has four selector keys 44 for actuating a desired group of bars 21. Each selector key 44 is pivotally mounted on an upright 45 passing through an opening in key 2, and attached to plate 1, below as shown in Figure 11. This opening is in the form of a slot, for the finger key 44 that runs right and left, the attachment of 45 to plate 1 being pivotal to permit rocking back and forth. Pin connected to the lower portion of each selector key 44 and depending therefrom are two rods 46 which freely pass through aligned openings in finger key 2 and the horizontal forward portion of housing 1. Depressing either side of a selector key 44 tilts the key and forces the depending rod 46 under the depressed side into engagement with a bar 21.

Again referring to Figure 5, the ends of housing 1 are closed by side plates 47 which taper downwardly and are pivoted at the tapered end on a bar 48, (note Figure 2), secured between posts C and E. The housing 1 may be swung through a small arc, approximately three eighths of an inch, and suitable stops 49 are provided on the bar 48 to limit the swing of the housing. This swinging shifts the rods 46 with relation to the bars 21, said bars 21 having integral bosses 49 positioned beneath rods 46 when the housing 1 is swung away from the operator. Swinging the housing 1 towards the operator changes the relative position of rods 46 with respect to bars 21 and results in a shorter swing of bar 21 when rod 46 is moved downwardly.

Finger keys 2 are mounted upon shaft 50 extending transversely through housing 1, an angularly disposed integral arm 51 extending from each key 2 forwardly into the housing, each arm 51 having its forward end shaped to function as a hook or latch 52. The latch 52 engages the upper edge of a block 53 mounted on a wire cable 54. To the upper end of cable 54 is attached a weight 55, heavier than the block 53, the other end of the wire cable being attached to the bottom of weight 55, pulleys 56 for guiding cable 54 being arranged as shown in Figure 5 to permit vertical movement of weight 55 and inclined movement of block 53. The weight 55 carries latches 57, 58, pivoted to the weight, for respectively engaging horizontal bars 59, 60, these bars being interconnected by an endless cable 61 passing over pulleys 62, the bars 59 and 60 therefore moving in unison. The bars 59, 60 are maintained in horizontal position by linkage devices 63 similar to those used on the bars 5 and 9, and shown in Figure 13. One wire cable 61 is controlled through the agency of the bars 59 and 60 by a plurality, ten in number, of wires 54 and the corresponding weights 55, each weight striking the leg 55$^a$ of a pivoted angle bar, the other leg 55$^b$ striking a spring held rod 55$^c$ to operate any form of well known rocker latch mechanism to release ratchet wheel 71. (See Figure 5$^a$.)

Upon depressing a finger key 2, latch 52 releases block 53 and permits weight 55 to descend; a spreader 64 secured to the housing 1 and disposed in grooves 65 in the weight 55 contacts with latch members 57, 58 to cause them to swing outwardly and to engage whichever one of bars 59, 60 is in the lowermost position.

Referring now to Figures 1 and 2, a spring housing 66 mounted on the frame A contains a spiral spring adapted to be wound up by means of hand crank 67 or suitable for treadle mechanism turning the shaft 68. Suitable releasing mechanism of the usual type permits the spring to rotate shaft 68, and thus impart motion to two arms 69, 70 which engage the ends of bars 59 and 60 through slots in the end of housing 1. The ratchet wheel 71 on shaft 68 is released on downward movement of weight 55, as previously explained, thus permitting rotation of shaft 68 through ninety degrees under the influence of the spring in housing 66. The shaft 68, on rotation, turns arms 69 and 70, and thus raises the lowermost bar 59 or 60, thus lifting weight 55 until stationary rollers 72 mounted in housing 1 swing latches 57, 58 inwardly, block 53 now being again held by latch 52.

Upward movement of the weight 55 raises one end of lever 73, pivoted at 74, by means of a dependent hook 75. The other end of lever 73, by means of hook 76, attached to pull rod 77, which is secured to a key 4, pulls the key 4 down and thus operates the type bars as hereinafter described. A spring 78 in a stationary cylinder 79, suitably attached to the frame A, is compressed on downward movement of pull rod 77, and acts to return the pull rod 77, key 4, and lever 73 to normal position.

Considering, at this point, the complete operation of a finger key 2 and its selector keys 44, attention is directed to Figure 24. This figure shows the key 2 displaced so as to disclose the ends of the eighteen levers or bars 21 positioned beneath each finger key 2. The housing 1, together with finger keys 2 and selector keys 44, may be shifted by the use of the operator's palms to a position towards the operator, a central position, or a position towards the machine, as desired. Two of the selector keys, designated in Figure 24, as 44', each therefore controls six bars 21 by rocking or leaning, while the other two, designated as 44", each control three bars 21, by means of their depending rods 46. In addition, rocking or shifting keys 44' forwardly as shown in dotted lines in Figure 11 (and pushing either front or rear of keys 44") enables each rod 46 to engage either its attendant bar 21 or the lug 49 on this attendant bar 21.

The four selector keys 44 therefore control eighteen bars 21, the specific bars operated on depending on the position of housing 1, and each bar may be moved a short or a long distance, depending on whether the keys 44 are shifted on their pivotal supports 45 or not. The distance each bar 21 moves determines the extent of the upward movement of rod 20, and the amount of the outward swing of rod 19, and therefore whether a primary short bar 34 or a secondary short bar 33 is engaged by rod 29, (see Figure 21), the corresponding primary bar 5 or secondary bar 9 being directly engaged by rod 19.

The result is, that depending on whether a short or a long throw is imparted to bar 21, rod 19 depresses either bar 5 or 9, and rod 29 depresses either short bar 33 or 34, so that the type character corresponding to and controlled by either bar 5 or 9 is actuated before or after the character corresponding to and controlled by short bar 33 or 34 is actuated. In other words, since bars 5 and 9 control the letter "e", while bars 33 and 34 control the letter "d", depressing the selector key and imparting a short throw to bar 21 will print "de", while depressing and shifting the selector key imparts a long throw to bar 21 and will print "ed". Of course, depressing the finger key alone, at its center, will print the letter "d" only, via bar 33, 29 then being over both 34 and 33, and normal. For reverse, 29 swings over 34 only, then 33 follows, delayed. The bars 9 are returned to their original position by the recovery weights W, although springs may be used if desired as shown at 5' in connection with bars 5; the return mechanism for bars 33 and 34 is shown in Figure 23.

The actual printing is done by type depressor bars 12, operated by detached rods 80 secured to each secondary bar 9, these rods 80 fitting in cups or depressions 81 (see Figure 21) for bars 9 above the depressor bars 12, and having hooks 82 for bars 9 below the depressor bars 12, these type depressor bars being pulled down by the downward movement of lever 73 under the influence of the springs in housing 66 and ratchet 71, through the operation of the mechanism shown in Figure 5. It is therefore evident that each finger key 2, controlling a primary letter, has three positions, each position controlling six secondary letters depending on the selector key used, and the shifting of the selector key 44 controls the printing of the secondary letter or character before or after the printing of the primary letter. Each finger key 2 and its four selector keys 44 thus give thirty-six combinations of the primary letter with a secondary letter.

Considering Figure 1, the third character control key 3 is centrally located in the space obtained by bending the type depressor bars to the right and left. The key 3 extends from front to rear of the keyboard across the three rows of casings 4, which as previously described take the place of the original typewriter keys, and house the actuating mechanism for the character selection and printing. As best shown in Figure 19, key 3 is slotted from top to bottom to allow bars 5 and 9 to function.

At the center of the front bar of frame B is attached the plate 83 extending downward to approximately the level of the forwardly extending portion of the housing 1. Extending towards the housing from the plate 83 is a vertical plate 84, shown in Figures 6, 7 and 8, and two side plates 85, these plates forming guides for keys 86, which as hereinafter described provide additional means for adding a third desired character or letter to a two letter combination formed as previously explained. The keys 86 are eight in number, stepped as shown in Figure 8, and are adapted to be actuated by the operator's thumbs. Each set of two keys, together with an attendant plate 87, the upper plates having depending sides as shown in Figure 8, controls two sets of three levers 88, 89 running forward and back, as shown in Figures 6, 9 and 10.

The engaging portions of these levers are brought into alignment for actuation by appropriate bending as shown in Figure 10. Levers 88, 89 are actuated by rollers or cam surfaces at the lower ends of uprights 90 and 91, secured to a horizontal bar 92, which is maintained in horizontal position by the type of pin, slot and link connection previously described, the lower links being pivoted at their centers to the side plate, said bar 92 being guided by the side walls 85 and center plate 84 to permit lateral shifting and downward movement of bar 92, slits being cut in bar 92 where the end pivots of the links unite with it. The bar 92 is depressed by rod 93 on downward movement of plate 87, when the plate is pressed down by pressure between the two keys 86. On such downward movement, upright 90 engages the leg 94 of the central bar 88, and shifts it forwardly about a pivot 95', (see Figure 6) thus pressing up on a bent over foot 96 of a rod 97, pivoted at 98 (see Figure 19) which movement swings out an arm 99 pivoted at 100 in the front or back wall of key 3 or in one of the cross partitions 101, and thus positions the notched lower end of arm 99 above a secondary bar 9.

If plate 87 is further depressed, the roller on upright 90 will pass over the apex of the nose of leg 94, thus allowing the bar 88 to resume its normal position, and restoring the rod 99 to its normal position. At this moment, however, the roller at the lower end of upright 91 now engages the leg 95 of the center bar 89, and thus, through similar mechanism, positions another arm 99 above another secondary bar 9. By depressing a key 86, bar 92 is shifted forward or backward to permit similar operation of the other bars 88 or 89, the shifting being accomplished through the medium of small pivoted bell cranks 102.

It is therefore evident that the central key 3 controls twenty-four bars and therefore twenty-four characters, which may be added as desired to the two letter combinations previously described. When the last two letters of a three letter combination are identical, there is no interference in printing because the central key 3 controls the character bar at a different point than the selector key; thus, as shown in Figure 21, movement of any type depressor bar 12 downward is independent of the control of bars 80, the cup and hook operating means permitting such downward independent movement.

The mechanism for causing the third character to be printed after the two letter combination has been printed, is shown in Figure 4. Inside the housing 1, between the bar 60 and the wall of the housing nearest the operator, and somewhat lower than the lowest position of bars 59 and 60, are mounted three transverse bars 103, 104 and 105, extending across the front of the machine. Supports 106 are attached to the roof of the housing 1 and carry parallel motion devices of the type previously described for maintaining these transverse bars horizontal at all times. From the bar 105 depends a vertical rod 107 adapted to engage and downwardly swing a lever 108 pivotally supported at a point 109. Pin and slot connected to lever 108 at its rearward end is another lever 110, pivotally mounted at 111. Pin connected to the rearward end of rod or lever 110 is a pull rod 112 rigidly attached to the casing of key 3 and adapted when lowered to move key 3 downwardly.

Below the weight 55, and attached to its dependent hook 75 is a flexible wire 113 extending downwardly around the lower side of a pulley 114, mounted on a stationary bracket 115 secured to the housing 1. The wire 113 extends upwardly from the pulley 114 between the bars 103 and 104, over a pulley 116 mounted near the roof of the housing, and then downwardly where it is attached to the upper face of weight 55. The wire 113 has a lug 117, preferably welded on, said lug 117 normally positioned a short distance above the bar 103. The bars 103, 104 and 105 are spring connected at their centers in the manner shown in Figure 14 for bars 5 and 9, one spring between bars 103 and 104, and a second spring between bars 104 and 105. These springs constrain bars 104 and 105 to successively follow downward movement of bar 103 at timed intervals.

The operating details in adding a third letter to a previously selected two letter combination may now be described. On pressing a panel 87 or a key 86, a rod 99 is positioned above a selected bar 9 (note Figure 19). The upward movement of hook 75 resulting from the depression of a finger key pulls a casing 4 downwardly and prints a selected two letter combination, as hereinbefore described. The upward movement of hook 75, by means of wire 113 and lug 117, also pulls down bar 103, which bar successively pulls bars 104 and which bar successively pulls bars 104 and 105 after it. Bar 105 is therefore pulled downward a delayed interval after bar 9, and rod 107 depresses the end of rod 108 and causes downward pull of key 3, and subsequent actuation of the selected third letter depressor bar, in timed sequence to the printing of the letters of the two letter combination.

While I have disclosed a preferred embodiment of my invention, I do not wish to be limited to the specific details described and illustrated, as changes may be made in the structure or the arrangement without departing from the spirit of my invention as defined in the appended claims.

I claim:

1. In a device for operating the key levers of a typewriter, in combination, power actuated keys each adapted to selectively engage a key lever for movement with said key, each key being also adapted to selectively engage a key lever for movement after said first selected lever, and manually operated selector keys to determine the key levers selected by the power actuated keys.

2. In a device for operating the key levers of a typewriter, in combination, power actuated keys each adapted to selectively engage a key lever for movement with said key, each key being also adapted to selectively engage a key lever for movement after said first selected lever, a third character key, means thereon to selectively engage a key lever, and means to actuate said last mentioned key to operate its selected key lever after the actuation of the two key levers by said first mentioned key.

3. In a device for operating the key levers of a typewriter, in combination, power actuated keys each adapted to selectively engage a key lever for movement with said key, each key being also adapted to selectively engage a key lever for movement after said first selected lever, a third character key, means thereon to selectively engage a key lever, means to actuate said last mentioned key to operate its selected key lever after the actuation of the two key levers by said first mentioned key, and manually operated selector keys to determine the key levers selected by the power actuated and third character keys.

4. In a device for operating the key levers of a typewriter, in combination, power actuated keys each adapted to selectively engage a key lever for movement with said key, each key being also adapted to selectively engage a key lever for movement after said first selected lever, and a manually operable selector key movable to associate with one of a group of said power actuated keys, and means whereby a single movement of said selector key determines the key levers selected by the selected power actuated key.

5. In a device for operating the key levers of a typewriter, in combination, a plurality of power actuated keys, selector mechanism on each key to operatively associate it with two selected key levers, and means to cause one of said key levers to be actuated after the other when said key is actuated.

6. In a device for operating the key levers of a typewriter, in combination, a plurality of power actuated keys, selector mechanism on each key to operatively associate it with two selected key levers, means to cause one of said key levers to be actuated after the other when said key is actuated, a group of selector keys each adapted to be associated selectively with at least two power actuated keys, and means on each selector key to determine the operations of the selectors on each power actuated key.

7. In a device for operating the key levers of a typewriter, in combination, a plurality of power actuated keys, selector mechanism on each key to operatively associate it with two selected key levers, means to cause one of said key levers to be actuated after the other when said key is actuated, a group of selector keys each adapted to be associated selectively with at least two power actuated keys, means on each selector key to determine the operations of the selectors on each power actuated key, power means, and mechanism on each selector key to apply said power to the power actuated key selected by it to actuate the same.

8. In a device for operating the key levers of a typewriter, in combination, a plurality of power actuated keys, selector mechanism on each key to operatively associate it with two selected key levers, means to cause one of said key levers to be actuated after the other when said key is actuated, a group of selector keys each adapted to be associated selectively with at least two power actuated keys, means on each selector key to determine the operations of the selectors on each power actuated key, a single third character key, means thereon to selectively engage a key lever, and means to actuate the key lever selected by said third character key after the actuation of the key levers selected by a power actuated key.

9. In a device for operating the key levers of a typewriter, in combination, a plurality of character keys each associated with a key lever, mechanism on each key to associate it with an additional selected key lever, and means on said key to cause a delayed movement of one of said key levers when said key is depressed.

10. In a device for operating the key levers of a typewriter, in combination, a plurality of character keys each associated with a key lever, mechanism on each key to associate it with an additional key lever, a group of selector keys, each adapted to be selectively associated with one of a plurality of character keys, and means on each selector key to control said mechanism.

11. In a device for operating the key levers of a typewriter, in combination, a plurality of character keys each associated with a key lever, mechanism on each key to associate it with an additional key lever, a group of selector keys, each adapted to be selectively associated with one of a plurality of character keys, means on each selector key to control said mechanism, and means on each selector key to cause the operation of the selected character key when the selector key is pressed.

12. In a device for operating the key levers of a typewriter, in combination, a plurality of character keys each associated with at least one key lever, mechanism on each character key adapted to associate it with an additional selected key lever, a group of selector keys, each adapted to selectively cooperate with one of a group of character keys, means to select a particular character key, means to operate said mechanism to select a particular key lever, a third character key, means thereon to selectively engage a key lever, and means to operate said keys to actuate said key levers in the selected sequence.

In testimony whereof I hereunto affix my signature.

WILLIAM PENDLETON LAMAR.